(12) United States Patent
Buchsbaum et al.

(10) Patent No.: US 10,237,000 B1
(45) Date of Patent: Mar. 19, 2019

(54) PHASE COMPENSATION IN AN NFC SYSTEM

(71) Applicant: NXP B.V., Eindhoven (NL)

(72) Inventors: Martin Buchsbaum, Graz (AT); Erich Merlin, Gratkorn (AT); Manuel Markus Figer, Graz (AT)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/973,724

(22) Filed: May 8, 2018

(51) Int. Cl.
*H04L 7/00* (2006.01)
*H04L 25/00* (2006.01)
*H04L 25/40* (2006.01)
*H04B 17/12* (2015.01)
*H04B 5/00* (2006.01)
*H04L 7/033* (2006.01)
*H04B 5/02* (2006.01)
*G06Q 20/32* (2012.01)

(52) U.S. Cl.
CPC ........... *H04B 17/12* (2015.01); *H04B 5/0062* (2013.01); *H04B 5/02* (2013.01); *H04L 7/0091* (2013.01); *H04L 7/0331* (2013.01); *G06Q 20/3278* (2013.01)

(58) Field of Classification Search
CPC ........ H04B 17/12; H04B 5/0062; H04B 5/02; H04L 7/0331; H04L 7/0091; G06Q 20/3278; G06K 7/10198; G06K 7/0008

USPC ................ 375/371, 354, 357, 358, 219, 220
See application file for complete search history.

(56) References Cited

U.S. PATENT DOCUMENTS

| | | | |
|---|---|---|---|
| 6,028,503 A | * | 2/2000 | Preishuberpflugl ........................ G06K 7/0008 340/10.4 |
| 6,193,164 B1 | * | 2/2001 | Arisawa ............... G06K 7/0008 235/487 |
| 9,887,832 B1 | | 2/2018 | Hueber et al. |
| 9,935,689 B2 | | 4/2018 | Hueber et al. |
| 2014/0341327 A1 | * | 11/2014 | Raggam ................ H04L 7/0331 375/376 |
| 2017/0169258 A1 | * | 6/2017 | Neffe .................. G06K 7/10198 |

* cited by examiner

*Primary Examiner* — Phuong Phu

(57) ABSTRACT

A method for compensating phase shift is provided. The method includes sweeping a transmitter (TX) clock frequency over a frequency range and sampling resistance values at a receiver (RX) circuit while sweeping the TX clock frequency. A first frequency in the frequency range is determined which corresponds to a maximum resistance value sampled at the RX circuit. Using a look-up table (LUT), a phase adjust value is determined based on the first frequency. A phase of the TX clock is adjusted based on the phase adjust value.

20 Claims, 4 Drawing Sheets

PHASE COMPENSATION IN AN NFC SYSTEM

BACKGROUND

Field

This disclosure relates generally to near field communication (NFC), and more specifically, to phase compensation in an NFC system.

Related Art

Today, the use of Near Field Communication (NFC) is becoming common place in applications such as contactless payment systems, security access systems, etc. A typical NFC based system consists of an NFC reader (e.g., Point of Sale terminal) and an NFC device, typically an NFC enabled card or a mobile phone. In order to perform a transaction using an NFC enabled device and an NFC reader, the NFC enabled device is brought near the NFC reader. The communication between the NFC enabled device and the NFC reader may fail if the NFC reader fails to properly demodulate the signal from the NFC enabled device. Such failures may occur if the NFC enabled device is not properly aligned with the NFC reader or if the NFC enabled device is not within a certain distance range from the NFC reader. However, with variations among NFC devices and NFC device manufacturing, other failures may occur.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

NFC readers are typically provided by multiple suppliers. One supplier's NFC reader can require a transmit signal having an initial phase setting different from another supplier's NFC reader. It is important for an NFC controller within an NFC device (e.g., smartphone) to accommodate such differences to establish stable communications between the NFC device and an NFC reader.

Generally, there is provided, a self phase compensation method which eliminates the need for expensive test equipment when tuning a transmit signal for a particular phase window in an NFC system. A transmitter (TX) signal initial phase is set in the NFC controller and a phase shift of the TX signal is determined at a receiver (RX) circuit by way of a receive signal path coupled between the transmitter and receiver. A simulation model of portions of the NFC system is used to create a lookup table programmed into NFC controller memory. With the determined phase shift, the lookup table is used to adjust the TX signal phase by way of a phase adjustment circuit to achieve a desired TX signal phase. The NFC system is operated in a special mode with the antenna unloaded while performing the self phase compensation method. After the self phase compensation method steps are performed, the NFC system may enter a normal operational mode.

Figure 1:
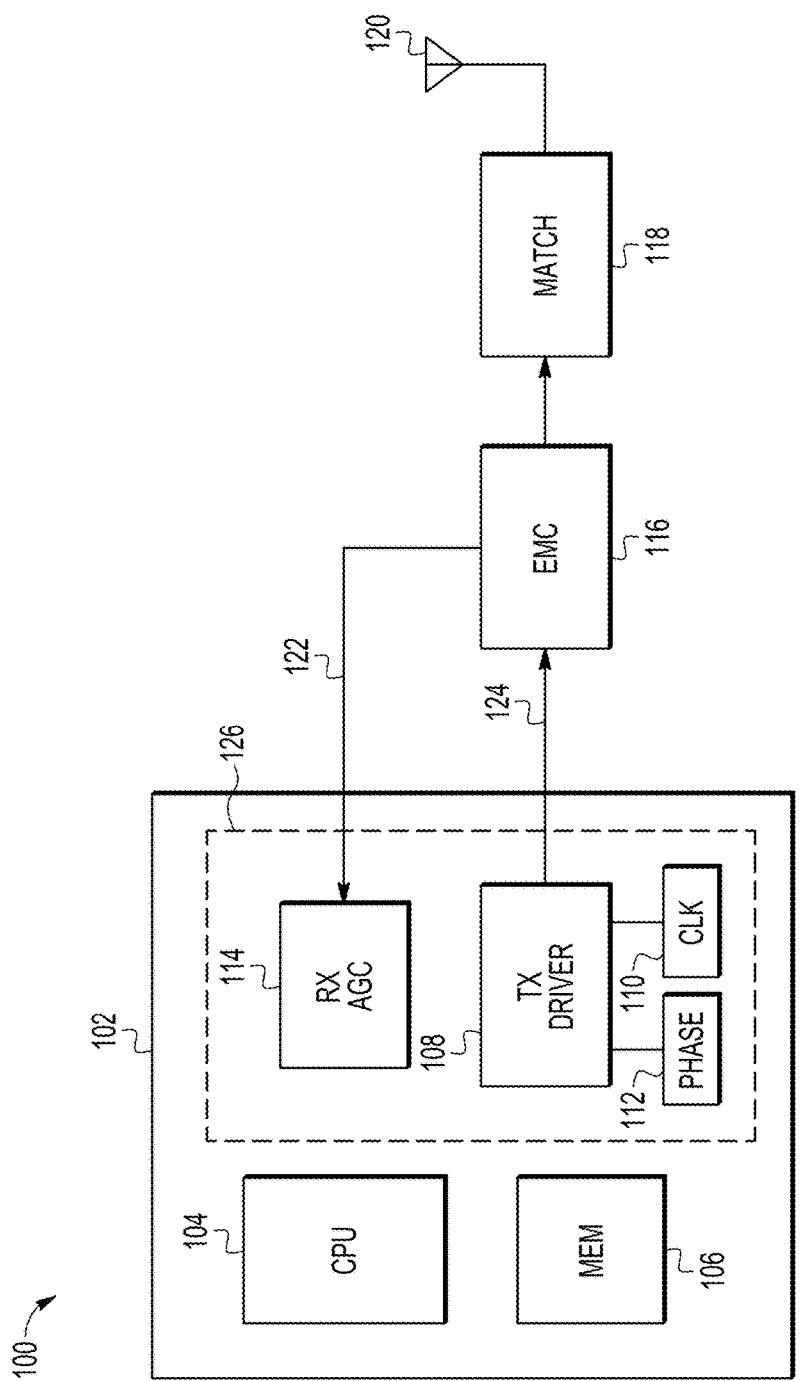
FIG. 1 illustrates, in simplified block diagram form, an exemplary near field communication (NFC) system in accordance with an embodiment.

FIG. 1 illustrates, in simplified block diagram form, an exemplary near field communication (NFC) system 100 in accordance with an embodiment. NFC system 100 includes a NFC controller 102, electromagnetic compatibility (EMC) network 116, matching network 118, and antenna 120. NFC controller 102 may be formed on an integrated circuit (IC) separate from EMC network 116, matching network 118, and antenna 120. For example, NFC system 100 may have EMC network 116, matching network 118, and antenna 120 formed on a printed circuit board (PCB) while NFC controller 102 may be mounted on the PCB as a separately packaged IC.

NFC controller 102 includes central processing unit (CPU) 104, memory 106, and radio frequency (RF) transceiver 126. NFC controller 102 may include other functional blocks and circuits.

Processor 104 may be any type of processor, including circuits for processing, computing, etc., such as microprocessor (MPU), microcontroller (MCU), digital signal processor (DSP), finite state machine (FSM), and the like. Processor 104 may be configured to execute instructions in order to carry out designated tasks. Memory 106 may include any suitable type of memory array, such as non-volatile memory (NVM), static random-access memory (SRAM), and others for example. Memory 106 may be coupled to processor 104 by way of a system bus (not shown). Memory 106 may also be coupled directly or tightly coupled to processor 104. NFC controller 102 may include multiple memories like memory 106 or a combination of different memory types. For example, memory 106 may include a flash memory array in addition to a separate SRAM array.

RF transceiver 126 includes transmitter (TX) driver circuit 108, clock generation circuit 110, phase adjustment circuit 112, and receiver (RX) automatic gain control (AGC) circuit 114 among other circuits (not shown). In some embodiments, an RF attenuator circuit and the like may be included in place of the RF AGC circuit 114. An output signal line 124 couples the TX driver circuit 108 with the EMC network 116. The EMC network 116 is coupled with the RX circuit by way of a receive signal line 122. Matching network 118 is coupled between the EMC network 116 and antenna 120. In operation, a transmit signal is output from the TX driver circuit 108 based on the phase and clock frequency provided by way of the clock generation circuit 110 and phase adjustment circuit 112. The transmit signal is propagated through the EMC network 116 and matching network 118 and transmitted at antenna 120. The transmit signal is monitored by the RX circuit 114 during a self phase compensation operation by way of a receive signal path coupled between the TX driver circuit 108 and the RX circuit 114. In operation, the RX circuit 114 serves to maintain a constant signal level by way of adjusting impedance. As such, resistance values of the RX circuit 114 based on the monitored signal can be utilized in determining a phase shift of the transmit signal.

Figure 2:
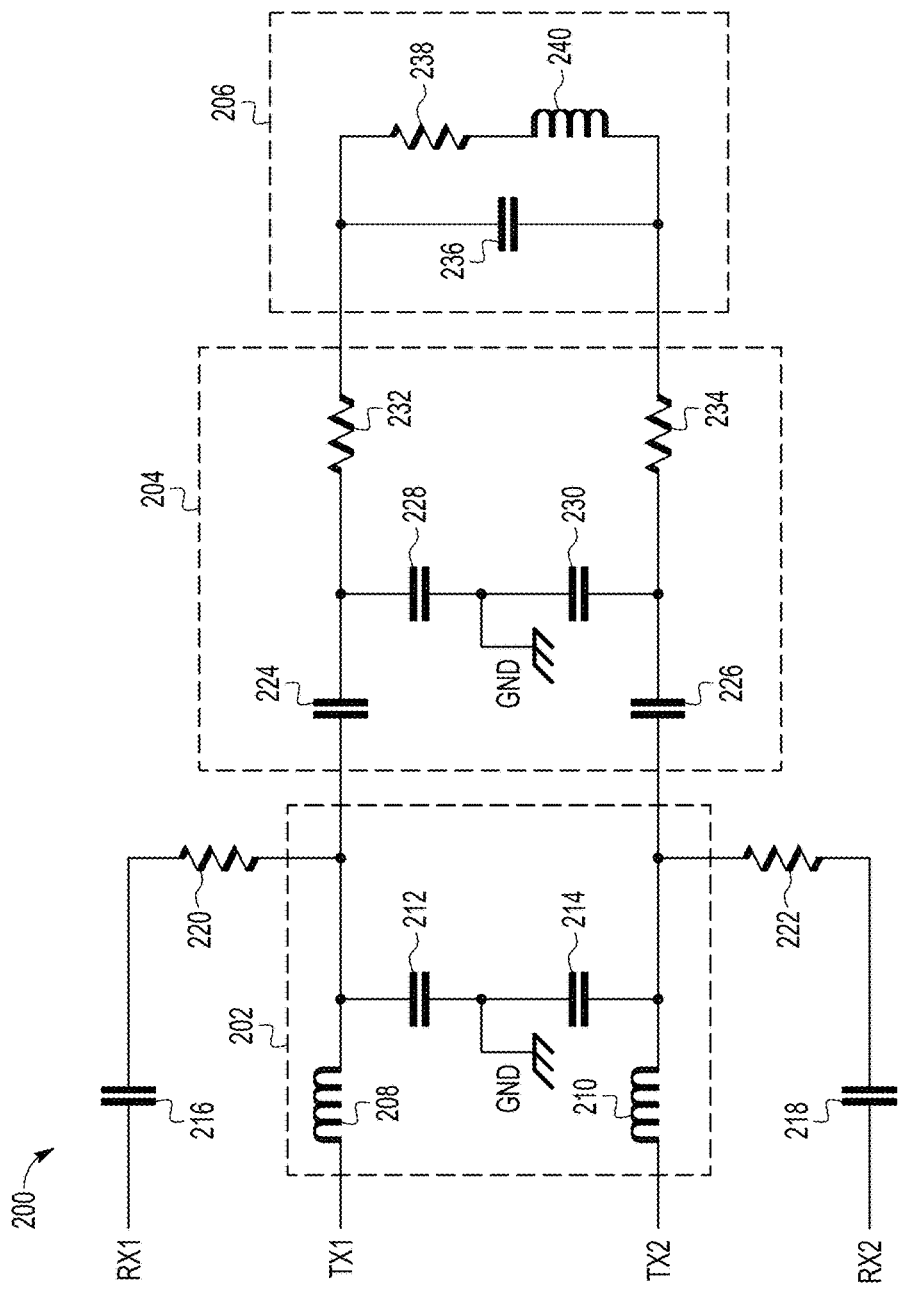
FIG. 2 illustrates, in simplified schematic diagram form, an example simulation model in accordance with an embodiment.

FIG. 2 illustrates, in simplified schematic diagram form, an example simulation model 200 in accordance with an embodiment. Simulation model 200 includes an example EMC network model 202, an example matching network model 204, and example antenna model 206. In this embodiment, simulation model 200 depicts a differential transmit signaling path having terminals labeled TX1 and TX2. Likewise, differential receive signaling path is depicted having terminals RX1 and RX2. In some embodiments, single-ended signaling paths may be employed for transmit and/or receive signals. Here, the EMC network model 202 corresponds to the EMC network 116 of FIG. 1 where terminals TX1 and TX2 are coupled to the TX driver circuit 108 and terminals RX1 and RX2 are coupled to the RX circuit 114. Accordingly, matching network model 204 corresponds to matching network 118 and antenna model 206 corresponds to antenna 120.

The EMC network model 202 includes inductors 208, 210 and capacitors 212, 214. A first terminal of inductor 208 is coupled at input terminal TX1 and a second terminal of inductor 208 is coupled to a first terminal of capacitor 212 at a first node. A second terminal of capacitor 212 is coupled to ground voltage supply terminal labeled GND. A first terminal of inductor 210 is coupled at input terminal TX2 and a second terminal of inductor 210 is coupled to a first terminal of capacitor 214 at a second node. A second terminal of capacitor 214 is coupled to the GND supply terminal. In some embodiments, the EMC network model 202 may include other components. In some embodiments, the EMC network model 202 may be formed in a single-ended configuration.

Receive signaling path includes capacitors 216, 218 and resistors 220, 222. A first terminal of capacitor 216 is coupled at terminal RX1 and a second terminal of capacitor 216 is coupled to a first terminal of resistor 220. A second terminal of resistor 220 is coupled at the first node. A first terminal of capacitor 218 is coupled at terminal RX2 and a second terminal of capacitor 218 is coupled to a first terminal of resistor 222. A second terminal of resistor 222 is coupled at the second node. In some embodiments, the receive signaling path may be formed in a single-ended configuration (e.g., capacitor 216, resistor 220 path).

The matching network model 204 includes capacitors 224-230 and resistors 232, 234. A first terminal of capacitor 224 is coupled to the EMC network model 202 at the first node and a second terminal of capacitor 224 is coupled to a first terminal of capacitor 228 at a third node. A second terminal of capacitor 228 is coupled to GND supply terminal. A first terminal of capacitor 226 is coupled to the EMC network model 202 at the second node and a second terminal of capacitor 226 is coupled to a first terminal of capacitor 230 at a fourth node. A second terminal of capacitor 230 is coupled to the GND supply terminal. A first terminal of resistor 232 is coupled at the third node and a second terminal of resistor 232 is coupled to the antenna model at a fifth node. A first terminal of resistor 234 is coupled at the fourth node and a second terminal of resistor 234 is coupled to the antenna model at a sixth node. In some embodiments, the matching network model 204 may include other components.

The antenna model 206 includes capacitor 236, resistor 238, and inductor 240. A first terminal of capacitor 236 is coupled at the fifth node and a second terminal of capacitor 236 is coupled at the sixth node. A first terminal of resistor 238 is coupled at the fifth node and a second terminal of resistor 238 is coupled to a first terminal of inductor 240. A second terminal of inductor 240 is coupled at the sixth node. In some embodiments, the antenna model 206 may include other components.

Figure 3:
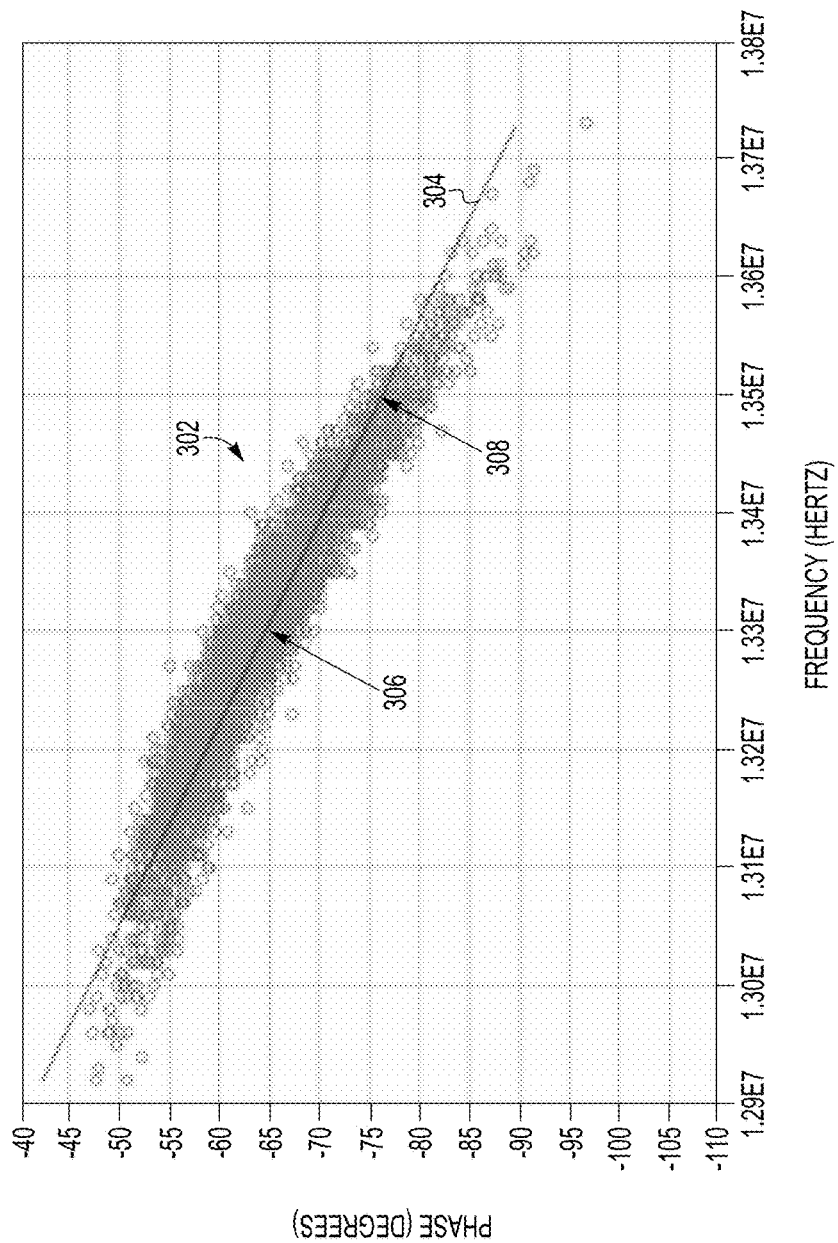
FIG. 3 illustrates, in simplified plot diagram form, example simulation results in accordance with an embodiment.

FIG. 3 illustrates, in simplified plot diagram form, example simulation results in accordance with an embodiment. Frequency values are shown in hertz (Hz) on the X-axis, and phase values are shown in degrees on the Y-axis. FIG. 3 includes a first plot 302 of data points depicting simulation results corresponding to the examples illustrated in FIG. 1 and FIG. 2, and a second plot 304 depicting a best fit line derived from the data points of plot 302. Here, plot 302 represents Monte Carlo simulation results determined by sweeping a TX driver clock frequency over a range of frequencies (e.g., 12 MHz to 16 MHz in 50 KHz steps) and measuring a corresponding resistance value and phase at the RX circuit 114 for each frequency of the range. In this embodiment, a PLL is coupled to provide a clock for the TX driver circuit and configured to sweep the clock frequency in 50 KHz steps over a 12 MHz to 16 MHz frequency range. Plot 304 is representative of a linear equation which depicts a simplified best fit curve of the correlation data points of plot 302.

By way of example, the plot diagram of FIG. 3 may be better understood. In the example, a first point 306 represents an initial phase setting of approximately −65 degrees corresponding to a frequency of approximately 13.3 MHz to achieve a desired TX driver clock phase. Manufacturing tolerances and the like affecting circuitry such as the EMC network 116 and matching network 118, and antenna tolerances may result in a phase shift. The point 306 at −65 degrees shows a center of Monte Carlo simulation runs with −65 degrees set as the initial phase value. The point 308 at −75 degrees shows an unwanted phase shift of −10 degrees. To achieve the TX driver clock nominal conditions, the initial phase setting needs to be adjusted by +10 degrees (e.g., phase adjust value).

Figures 4, 5:
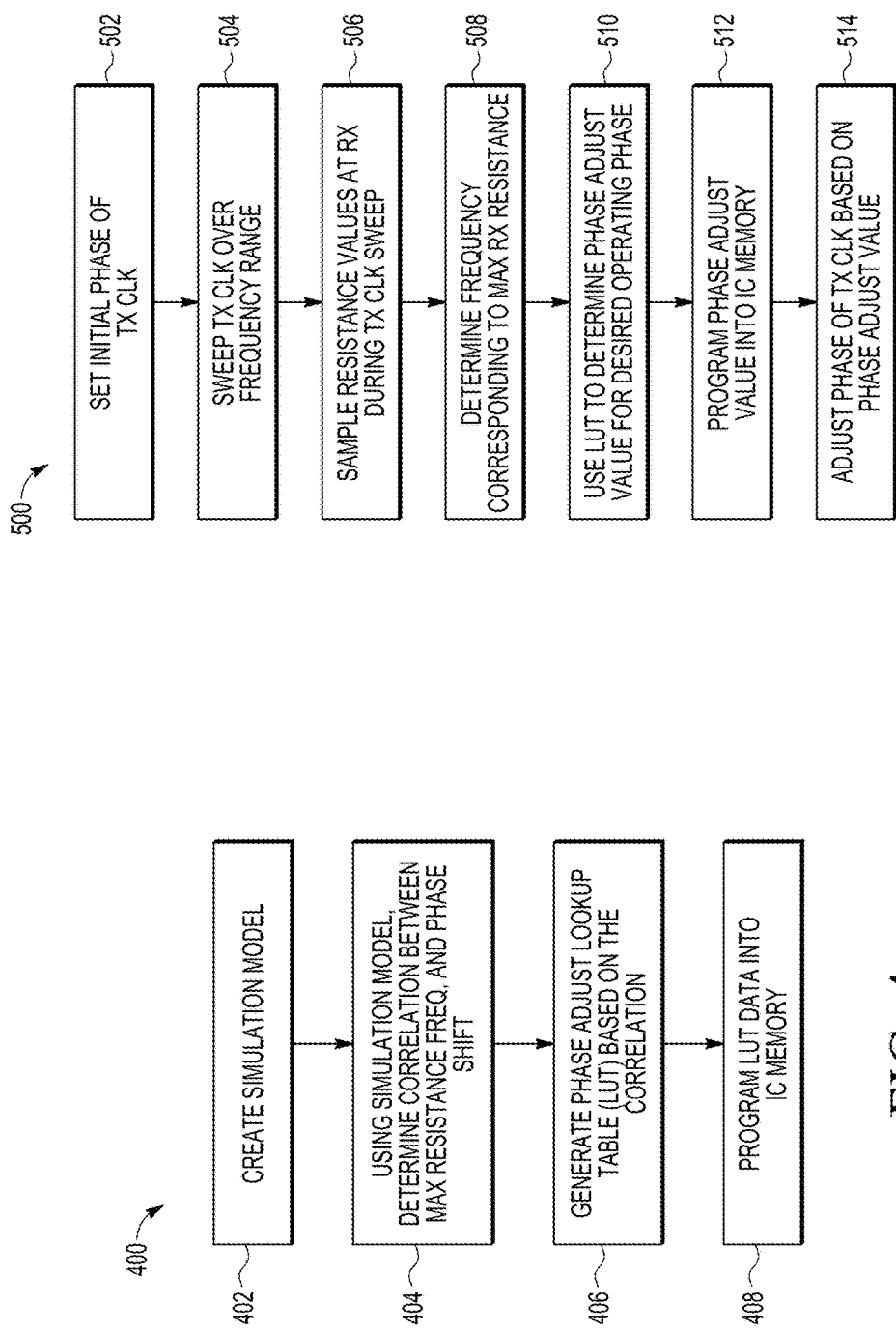
FIG. 4 illustrates, in simplified flow diagram form, exemplary look-up table (LUT) generation in accordance with an embodiment.
FIG. 5 illustrates, in simplified flow diagram form, exemplary phase compensation in accordance with an embodiment.

FIG. 4 illustrates, in simplified flow diagram form, exemplary look-up table (LUT) generation method 400 in accordance with an embodiment. The LUT generation method 400 includes modelling the NFC system consistent with depictions of FIG. 1 and FIG. 2.

At step 402, a simulation model is created. The simulation model includes example EMC network model 202, example matching network model 204, and example antenna model 206 as shown in FIG. 2. The simulation model also includes a TX driver circuit model coupled to the EMC network model 202, and a receive signaling path coupled between the EMC network model 202 and RX circuit 114.

At step 404, the simulation model is used to determine a correlation between maximum resistance at the RX circuit 114 and phase shift of the signal received at the RX circuit 114. A clock frequency of the TX driver circuit model is swept over a frequency range (e.g., 12 MHz to 16 MHz in 50 KHz steps) and a maximum of measured resistance values is determined at the RX circuit. A best fit curve (e.g., linear equation) is determined from the simulation data. In some embodiments, the clock frequency of the TX driver circuit model may be swept over other frequency ranges and steps.

At step 406, a lookup table (LUT) is generated based on the correlation best fit curve. For example, a linear equation which depicts a simplified best fit curve of the correlation data points may result in a table including frequency versus phase data entries.

At step 408, program LUT data into an integrated circuit (IC) device. In this embodiment, the IC device may be characterized as a near field communication (NFC) controller 102 shown in FIG. 1. The LUT data may be programmed or written into memory such as memory 106 in FIG. 1. It is desirable to program the LUT data into a non-volatile memory such as read-only memory (ROM) or flash memory. In some embodiments, the LUT date may be programmed or written into other volatile or non-volatile memory types.

FIG. 5 illustrates, in simplified flow diagram form, exemplary phase compensation method 500 in accordance with an embodiment. In this embodiment, the phase compensation method 500 includes setting an initial TX driver clock phase in the NFC controller 102 and using the LUT data programmed into NFC controller memory 106 to adjust the TX driver clock phase by way of the phase adjustment circuit 112 to achieve a desired TX driver clock phase. The steps of the example phase compensation method 500 are generally performed when the NFC controller 102 is in a special mode such as a test mode, phase compensation mode, calibration mode, and the like, and with the NFC system antenna 120 unloaded (e.g., not connected to test equipment). After the phase compensation method 500 steps are performed, the NFC controller may enter a normal operational mode.

At step 502, set initial phase of TX driver clock. A clock source such as clock generation circuit 110 of FIG. 1 is coupled to provide a TX driver clock. In this embodiment, clock generation circuit 110 includes a PLL to generate the TX driver clock. At this step, the initial phase of the TX driver clock is set. The initial phase value of the TX driver clock is generally set a desired operational phase value.

At step 504, sweep the TX driver clock over a frequency range. While in a special mode (e.g., test mode) and with the NFC system antenna 120 unloaded, the frequency of the clock source for the TX driver circuit is swept in steps over a frequency range. In this embodiment, the clock source for the TX driver circuit is configured to sweep the clock frequency in 50 KHz steps over a range of 12 MHz to 16 MHz. In some embodiments, the clock frequency of the TX driver circuit may be swept over other frequency ranges and steps.

At step 506, sample resistance values at the RX circuit 114 during the TX driver clock sweep. While sweeping the TX driver clock frequency over a range of frequencies, resistance values are sampled and measured at the RX circuit 114 by way of a receive signal path coupled between the RX circuit 114 and the TX driver circuit 108. In some embodiments, other electrical parameters may be sampled while sweeping the TX driver clock frequency of the range of frequencies.

At step 508, determine a frequency corresponding to a maximum RX resistance value. At this step, the RX circuit 114 provides a code indicative of the sampled resistance values. The codes are used by the CPU 104 to determine a frequency corresponding to a maximum sampled resistance value. In some embodiments, the determined frequency may correspond to other electrical parameter values.

At step 510, use the LUT of FIG. 4 to determine a phase adjust value to achieve TX driver clock nominal conditions. At this step, the LUT previously programmed into the IC device is used to determine the phase adjust value to achieve nominal operating conditions of the TX driver clock. For example, the initial phase value may be set at −65 degrees for a nominal −65 degrees operating phase of the TX driver clock. Because manufacturing tolerances, parasitic variability, and the like may affect circuitry such as the EMC network 116 and matching network 118, a phase shift (e.g., −10 degrees) may occur. Accordingly, by use of the LUT, a phase adjust value is determined and used to modify or replace the initial phase value. For example, an initial phase value may be set at −65 degrees and a phase shift of −10 degrees may be determined, thus requiring a phase adjust value of +10 degrees to achieve the nominal operating phase of the TX driver clock.

At step 512, program the phase adjust value into IC device memory. The phase adjust value is programmed into NFC controller memory 106. It is desirable to program the phase adjust value into a non-volatile memory (e.g., flash memory) location. At this step, it may be desirable to overwrite the initial phase value based on the phase adjust value so that the TX driver clock will use a phase compensated value during normal operating modes. In some embodiments, the phase adjust value may be programmed or written into other volatile or non-volatile memory types.

At step 514, adjust phase of the TX driver clock based on the programmed phase adjust value. At this step, the NFC controller 102 may exit the special mode and enter a normal operating mode whereby the TX driver circuit utilizes the compensated phase value based on the phase adjust value programmed into NFC controller memory 106.

Generally, there is provided, a method including sweeping a transmitter (TX) clock frequency over a frequency range; sampling resistance values at a receiver (RX) circuit while sweeping the TX clock frequency over the frequency range; determining a first frequency in the frequency range which corresponds to a maximum resistance value sampled at the RX circuit; using a look-up table (LUT) to determine a phase adjust value based on the first frequency; and adjusting a phase of the TX clock based on the phase adjust value. The method may further include generating by way of a TX driver circuit a signal based on the TX clock, the signal received at the RX circuit by way of a receive signal path coupled between the TX driver circuit and the RX circuit. At least a portion of the receive signal path may include at least a portion of an electromagnetic compatibility (EMC) network coupled at an output of the TX driver circuit. The receive signal path may be formed at least in part on a printed circuit board (PCB), and wherein the TX driver circuit may be formed in a near-field communication (NFC) integrated circuit (IC) mounted on the PCB. The method may further include setting a phase of the TX clock to an initial value; wherein adjusting the phase of the TX clock includes adding or subtracting the phase adjust value to/from the initial value. The RX circuit may be characterized as an automatic gain control (AGC) circuit, the AGC circuit providing codes indicative of the sampled resistance values at the AGC circuit. Determining the first frequency may be determined by using the AGC provided codes. The LUT may include values based on a correlation of frequency maximum resistance values sampled at the receiver circuit with phase adjust values. The sweeping, sampling, determining, using, and adjusting steps may be performed with an NFC system having an unloaded antenna. The sweeping, sampling, determining, using, and adjusting steps may be performed with an NFC system during a phase compensation mode or a test mode.

In another embodiment, there is provided, a method for compensating phase shift in a near field communication (NFC) system, the method including sweeping a transmitter (TX) clock frequency over a frequency range; generating a signal by way of a TX driver circuit, the signal based on the TX clock; measuring resistance values of the signal received at a receiver (RX) circuit while sweeping the TX clock frequency over the frequency range; determining a first frequency in the frequency range which corresponds to a maximum resistance value sampled at the RX circuit; using a look-up table (LUT) to determine a phase adjust value based on the first frequency; and adjusting a phase of the TX clock based on the phase adjust value. The RX circuit may be coupled to the TX driver circuit by way of a receive signal path. At least a portion of the receive signal path may include at least a portion of an electromagnetic compatibility (EMC) network coupled at an output of the TX driver circuit. The receive signal path may be formed at least in part on a printed circuit board (PCB), and wherein the TX driver circuit may be formed in a near-field communication (NFC) controller integrated circuit (IC) mounted on the PCB. The RX circuit may be characterized as an automatic gain control (AGC) circuit, the AGC circuit providing a code indicative of a measured resistance value of the signal, the code used to determine the first frequency. Sweeping the TX clock frequency may include incrementing or decrementing frequency values of a PLL coupled to provide the TX clock frequencies. The sweeping, generating, measuring, determining, using, and adjusting steps may be performed while having the NFC system antenna unloaded.

In yet another embodiment, there is provided, a method for compensating phase shift in a near field communication (NFC) system, the method including setting an initial phase of a transmitter (TX) clock; sweeping the TX clock frequency over a frequency range; generating a signal by way of a TX driver circuit, the signal based on the TX clock; measuring resistance values of the signal received at a receiver (RX) circuit while sweeping the TX clock frequency over the frequency range; determining a first frequency in the frequency range which corresponds to a maximum resistance value sampled at the RX circuit; using a look-up table (LUT) to determine a phase adjust value based on the first frequency; and adjusting the initial phase of the TX clock based on the phase adjust value. The RX circuit may be coupled to the TX driver circuit by way of a receive signal path, at least a portion of the receive signal path may include at least a portion of an electromagnetic compatibility (EMC) network coupled at an output of the TX driver circuit. The RX circuit may be characterized as an automatic gain control (AGC) circuit, the AGC circuit providing a code indicative of a measured resistance value of the signal, the code used at least in part to determine the first frequency.

By now it should be appreciated that there has been provided, a self phase compensation method which eliminates the need for expensive test equipment when tuning a transmit signal for a particular phase window in an NFC system. A transmitter (TX) signal initial phase is set in the NFC controller and a phase shift of the TX signal is determined at a receiver (RX) circuit by way of a receive signal path coupled between the transmitter and receiver. A simulation model of portions of the NFC system is used to create a lookup table programmed into NFC controller memory. With the determined phase shift, the lookup table is used to adjust the TX signal phase by way of a phase adjustment circuit to achieve a desired TX signal phase. The NFC system is operated in a special mode with the antenna unloaded while performing the self phase compensation method. After the self phase compensation method steps are performed, the NFC system may enter a normal operational mode.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:
1. A method comprising:
   sweeping a transmitter (TX) clock frequency over a frequency range;
   sampling resistance values at a receiver (RX) circuit while sweeping the TX clock frequency over the frequency range;
   determining a first frequency in the frequency range which corresponds to a maximum resistance value sampled at the RX circuit;
   using a look-up table (LUT) to determine a phase adjust value based on the first frequency; and
   adjusting a phase of the TX clock based on the phase adjust value.

2. The method of claim 1, further comprises:
generating by way of a TX driver circuit a signal based on the TX clock, the signal received at the RX circuit by way of a receive signal path coupled between the TX driver circuit and the RX circuit.

3. The method of claim 2, wherein at least a portion of the receive signal path comprises at least a portion of an electromagnetic compatibility (EMC) network coupled at an output of the TX driver circuit.

4. The method of claim 2, wherein the receive signal path is formed at least in part on a printed circuit board (PCB), and wherein the TX driver circuit is formed in a near-field communication (NFC) integrated circuit (IC) mounted on the PCB.

5. The method of claim 1, further comprises:
setting a phase of the TX clock to an initial value;
wherein adjusting the phase of the TX clock comprises adding or subtracting the phase adjust value to/from the initial value.

6. The method of claim 1, wherein RX circuit is characterized as an automatic gain control (AGC) circuit, the AGC circuit providing codes indicative of the sampled resistance values at the AGC circuit.

7. The method of claim 6, wherein determining the first frequency is determined by using the AGC provided codes.

8. The method of claim 1, wherein the LUT comprises values based on a correlation of frequency maximum resistance values sampled at the receiver circuit with phase adjust values.

9. The method of claim 1, wherein the sweeping, sampling, determining, using, and adjusting steps are performed with an NFC system having an unloaded antenna.

10. The method of claim 1, wherein the sweeping, sampling, determining, using, and adjusting steps are performed with an NFC system during a phase compensation mode or a test mode.

11. A method for compensating phase shift in a near field communication (NFC) system, the method comprising:
sweeping a transmitter (TX) clock frequency over a frequency range;
generating a signal by way of a TX driver circuit, the signal based on the TX clock;
measuring resistance values of the signal received at a receiver (RX) circuit while sweeping the TX clock frequency over the frequency range;
determining a first frequency in the frequency range which corresponds to a maximum resistance value sampled at the RX circuit;
using a look-up table (LUT) to determine a phase adjust value based on the first frequency; and
adjusting a phase of the TX clock based on the phase adjust value.

12. The method of claim 11, wherein the RX circuit is coupled to the TX driver circuit by way of a receive signal path.

13. The method of claim 12, wherein at least a portion of the receive signal path comprises at least a portion of an electromagnetic compatibility (EMC) network coupled at an output of the TX driver circuit.

14. The method of claim 12, wherein the receive signal path is formed at least in part on a printed circuit board (PCB), and wherein the TX driver circuit is formed in a near-field communication (NFC) controller integrated circuit (IC) mounted on the PCB.

15. The method of claim 11, wherein RX circuit is characterized as an automatic gain control (AGC) circuit, the AGC circuit providing a code indicative of a measured resistance value of the signal, the code used to determine the first frequency.

16. The method of claim 11, wherein sweeping the TX clock frequency comprises incrementing or decrementing frequency values of a PLL coupled to provide the TX clock frequencies.

17. The method of claim 11, wherein the sweeping, generating, measuring, determining, using, and adjusting steps are performed while having the NFC system antenna unloaded.

18. A method for compensating phase shift in a near field communication (NFC) system, the method comprising:
setting an initial phase of a transmitter (TX) clock;
sweeping the TX clock frequency over a frequency range;
generating a signal by way of a TX driver circuit, the signal based on the TX clock;
measuring resistance values of the signal received at a receiver (RX) circuit while sweeping the TX clock frequency over the frequency range;
determining a first frequency in the frequency range which corresponds to a maximum resistance value sampled at the RX circuit;
using a look-up table (LUT) to determine a phase adjust value based on the first frequency; and
adjusting the initial phase of the TX clock based on the phase adjust value.

19. The method of claim 18, wherein the RX circuit is coupled to the TX driver circuit by way of a receive signal path, at least a portion of the receive signal path comprises at least a portion of an electromagnetic compatibility (EMC) network coupled at an output of the TX driver circuit.

20. The method of claim 18, wherein RX circuit is characterized as an automatic gain control (AGC) circuit, the AGC circuit providing a code indicative of a measured resistance value of the signal, the code used at least in part to determine the first frequency.

* * * * *